US011400938B2

(12) United States Patent
Levin (10) Patent No.: US 11,400,938 B2
(45) Date of Patent: Aug. 2, 2022

(54) METHOD FOR CONTROLLING A DRIVLINE OF A VEHICLE

(71) Applicant: VOLVO TRUCK CORPORATION, Gothenburg (SE)

(72) Inventor: Robin Levin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/272,849

(22) PCT Filed: Sep. 14, 2018

(86) PCT No.: PCT/EP2018/074894
§ 371 (c)(1),
(2) Date: Mar. 2, 2021

(87) PCT Pub. No.: WO2020/052776
PCT Pub. Date: Mar. 19, 2020

(65) Prior Publication Data
US 2021/0317885 A1 Oct. 14, 2021

(51) Int. Cl.
*B60W 30/186* (2012.01)
*B60W 10/02* (2006.01)
(Continued)

(52) U.S. Cl.
CPC ........ *B60W 30/186* (2013.01); *B60W 10/023* (2013.01); *B60W 10/11* (2013.01);
(Continued)

(58) Field of Classification Search
CPC ......... B60W 2710/029; B60W 30/186; B60W 10/023; B60W 10/02; B60W 10/11;
(Continued)

(56) References Cited

U.S. PATENT DOCUMENTS

| 4,576,263 A | * | 3/1986 | Lane | ............... F16D 48/066 |
| | | | | 477/72 |
| 2003/0150685 A1 | * | 8/2003 | Iida | ............... F16D 27/115 |
| | | | | 192/82 T |

(Continued)

FOREIGN PATENT DOCUMENTS

| DE | 102006024290 A1 | 11/2007 |
| DE | 102015208849 A1 | 11/2016 |

OTHER PUBLICATIONS

International Search Report and Written Opinion dated Jun. 24, 2019 in corresponding International PCT Application No. PCT/EP2018/074894, 7 pages.

*Primary Examiner* — Timothy Hannon
(74) *Attorney, Agent, or Firm* — Venable LLP; Jeffri A. Kaminski (57) ABSTRACT

The disclosure relates to a method for controlling a driveline (10) of a vehicle (1), wherein the driveline (10) at least comprises a transmission (13) and a clutch (12), wherein the clutch (12) is adapted to be provided between the transmission (13) and a propulsion unit (11) of the driveline (10), wherein the method comprises the steps of; predicting an imminent drive route, identifying if the imminent drive route comprises any clutch severity classification (CSC), and if the imminent drive route comprises a clutch severity classification (CSC)—estimating (103) an expected clutch temperature (Tic) dependent on at least the clutch severity classification (CSC) and one vehicle parameter (Vp), wherein, the clutch severity classification (CSC) is at least dependent on an inclination of the imminent drive route, and if (105) the expected clutch temperature (Tic) is above a clutch temperature threshold value (Tt); controlling (106) the driveline (10) in a critical heat mode, wherein in the critical heat mode the transmission (13) is controlled such (Continued)

that a clutch temperature increase is lower in comparison to a normal driveline control mode.

14 Claims, 2 Drawing Sheets

(51) Int. Cl.
*B60W 10/11* (2012.01)
*B60W 40/04* (2006.01)
*B60W 40/072* (2012.01)
*B60W 40/076* (2012.01)

(52) U.S. Cl.
CPC .......... *B60W 40/04* (2013.01); *B60W 40/072* (2013.01); *B60W 40/076* (2013.01); *B60W 2300/12* (2013.01); *B60W 2510/0291* (2013.01); *B60W 2555/20* (2020.02); *B60W 2710/021* (2013.01); *B60W 2710/029* (2013.01); *B60W 2710/1005* (2013.01)

(58) Field of Classification Search
CPC ...... B60W 40/02; B60W 40/04; B60W 40/06; B60W 40/064; B60W 40/068; B60W 40/072; B60W 40/076; F16D 2500/7045; F16D 48/06; F16D 2300/0214; F16D 2500/1112; F16D 2500/30405; F16D 2500/3122; F16D 2500/3124; F16D 2500/5106; F16D 2500/70426; F16D 2500/7043; F16D 2500/10412; F16D 2500/3127; F16D 2500/50296; F16D 2500/50825; F16H 2059/666; F16H 2059/725; F16H 2061/128; F16H 2302/04; F16H 61/0213; F16H 59/56
See application file for complete search history.

(56) References Cited

U.S. PATENT DOCUMENTS

| | | |
|---|---|---|
| 2009/0170659 A1 | 7/2009 | Petzold et al. |
| 2010/0030437 A1 | 2/2010 | Kim et al. |
| 2012/0261228 A1 | 10/2012 | Chen et al. |
| 2012/0312222 A1 | 12/2012 | Shinohara et al. |
| 2015/0323395 A1* | 11/2015 | Kawakami ............. F16H 59/72 702/130 |
| 2016/0076644 A1* | 3/2016 | Ooshima ................ F16D 48/06 701/51 |
| 2016/0084375 A1* | 3/2016 | Yoon .................... F16H 61/688 701/55 |
| 2017/0122431 A1 | 5/2017 | Cho |
| 2017/0267240 A1* | 9/2017 | Cho .................... B60W 30/188 |
| 2018/0163855 A1* | 6/2018 | Cho .................... B60W 40/105 |

* cited by examiner

METHOD FOR CONTROLLING A DRIVLINE OF A VEHICLE

CROSS-REFERENCE TO RELATED APPLICATIONS

This application is a U.S. National Stage application of PCT/EP2018/074894, filed Sep. 14, 2018, and published on Mar. 19, 2020, as WO 2020/052776 A1, all of which is hereby incorporated by reference in its entirety.

TECHNICAL FIELD

The invention relates to a method for controlling a driveline of a vehicle.

The invention can be applied in motor vehicles, and especially heavy-duty vehicles, such as trucks, buses and construction equipment. Although the invention will be described with respect to a truck, the invention is not restricted to this particular vehicle, but may also be used in other vehicles as mentioned above.

BACKGROUND

A vehicle driveline is normally provided with a clutch arranged between a propulsion unit and a transmission. The clutch is subjected to high loads, especially at start of the vehicle. When the clutch is subjected to high loads, a lot of heat is generated, which must be dissipated. If the clutch is overheated, the clutch functionality of the clutch might be reduced and the clutch wear is increased.

To avoid overheating of the clutch several measures can be taken. In US 2012/0312222 a gear shift indicator which can reduce bothersome feelings of the driver in a vehicle provided with a manual gear transmission is disclosed. The control unit acquires information about the travelling state of the vehicle, and calculates a target gearshift stage for improving fuel consumption. A gearshift restriction unit is operative to set a gearshift stage to be restricted in accordance with the degree of inclination of the road surface on which the vehicle is travelling. The restriction unit is operative to set a gearshift stage to be restricted in accordance with the oil temperature of hydraulic oil to be supplied to the gear transmission. US 2012/0312222 presents a method that may be used to avoid overheating of the oil in the transmission by the gearshift recommendations of the gear shift indicator. An implementation to automated clutch is not presented and the risk of overheating is still present.

SUMMARY

An object of the present invention is to provide a method to reduce the risk of overheating an automated clutch provided in-between a propulsion unit and a transmission in a vehicle driveline.

The object is achieved by a method according to claim 1. According to a first aspect, the present invention solves the above identified objective by providing a method of controlling a driveline of a vehicle, wherein the driveline at least comprises a transmission and a clutch, wherein the clutch is adapted to be provided between the transmission and a propulsion unit of the driveline, and the method comprises the steps of;

predicting an imminent drive route for the vehicle, and identifying if the imminent drive route comprises any clutch severity classification, and if the imminent drive route comprises a clutch severity classification estimating an expected clutch temperature dependent on at least the clutch severity classification and one vehicle parameter, wherein, the clutch severity classification is at least dependent on an inclination of the imminent drive route, and if the expected clutch temperature is above a clutch temperature threshold value;

controlling the driveline in a critical heat mode, wherein in the critical heat mode the transmission is controlled such that a clutch temperature increase is lower in comparison to a normal driveline control mode.

Hence, if the expected clutch temperature is above a clutch temperature threshold value and if the driveline is not operating in a critical heat mode, the driveline control mode is switching operation mode for the driveline to the critical heat mode. If the driveline is already controlled in the critical heat mode, this control mode is kept.

An exemplary clutch temperature threshold value is between 200 and 400 deg. C. for a dry clutch and about 170 deg. C. for a wet clutch.

In the critical heat mode, the transmission is controlled such that less heat generating clutch slippage is occurring. Due to the predictive control of the driveline, the transmission can be controlled in the critical heat mode as soon as there is a foreseen risk of an overheated clutch, and not just when the clutch actually reaches a critical temperature. Due to the predictive and thereby preventive introduction of the critical heat mode the risk for actually overheating the clutch is reduced compared to conventional control methods. By introducing heat reducing measures when an imminent drive route indicates high clutch activity, and thereby already before the clutch is overheated or close to be overheated, a more preventive heat control can be achieved.

The method uses a clutch severity classification, which is an indication of the load the clutch will be subjected to during the imminent driving route. The clutch severity classification is at least based on the inclination of the road and especially the uphill inclination of a road.

An exemplary advantage with using the clutch severity classification instead of estimating the clutch temperature directly is that an estimation of the clutch temperature can be done only when there is a risk of too high increase of the clutch temperature or to high clutch temperature (i.e. when there is a clutch severity classification comprised in the imminent driving route), whereby calculation power of the electronic controllers of the vehicle is saved. Additionally if there is a clutch severity classification comprised in the imminent driving route, the clutch severity classification can be used to estimate the expected clutch temperature.

The expected clutch temperature is further dependent on at least one vehicle parameter, where not limiting examples of vehicle parameter are current clutch temperature, vehicle weight and rolling resistance.

In its most straight forward embodiment, the estimated clutch temperature is estimated to a temperature above the clutch temperature threshold value every time the imminent driving route comprises a clutch severity classification and the total vehicle weight is above a vehicle weight threshold value, whereby the drive line would be controlled in the critical heat mode. Such an implementation would ensure that a critical clutch temperature would never be reached.

The prediction of an imminent drive route can be made in various ways. For example, by GPS (or similar global navigation satellite system (GNSS) such as GLOSNASS; BDS, Galileo) and/or cellular triangulation or similar, the position of the vehicle can be obtained with a high accuracy. In addition, by positioning the vehicle location on a detailed map with road information, such as topography, curves of the road and traffic information, the imminent drive route and its effect on the vehicle can be estimated. The imminent drive route can be determined from e.g. a predetermined given route or a probability prediction based on historical vehicle, fleet or traffic information data. For the case of simplicity and explanation within this disclosure it is referred to a navigation device, wherein with a navigation device it is meant a device that has the capability to predict the imminent drive route, independently of the technology used for the prediction. The navigation device can be a local navigation device or a central navigation device which the vehicle accesses remotely. The navigation device can communicate with the other control units of the vehicle. In the information received from the navigation device, the information of the clutch severity classification is included.

The clutch severity classification can be additionally dependent on vehicle history information, collected over time. I.e. the vehicle control system registers a clutch severity classification for a specific position, if the clutch temperature threshold value has been reached at that position. In a similar manner, the clutch severity classification can be a fleet history information shared in a whole or part of a fleet of vehicles. In one embodiment, the clutch severity classification is dependent on the topography of the imminent driving route.

A position can be a position with specific coordinates or a road segment between two positions with specific coordinates on a road. For the purpose of this description will hereinafter be referred to "a position", which should be interpreted as any of a position with specific coordinates or a road segment between two positions with specific coordinates.

In one exemplary embodiment of the method, a position is a position with specific coordinates. One exemplary effect of having specific coordinates provided with clutch severity classification is that a high resolution of the classification can be achieved.

In one exemplary embodiment of the method, a position is a road segment between two positions with specific coordinates. One exemplary effect of having a road segment provided with clutch severity classification is that the complexity of the classification can be reduced, by using e.g. an average or median value of the road segment for the clutch severity classification.

The clutch severity classification is preferably accessible by the navigation device of the vehicle. The information of clutch severity classification can be stored locally or centrally and for example be a separate list with positions that is provided with a clutch severity classification, whereby if the imminent driving route passes one of the positions, the clutch severity classification is included in the information of the imminent driving route. Alternatively, the information of the clutch severity classification is included directly in the map information in similar manner as for example speed limits, topography and/or other road specific information.

The topography of the imminent drive route effects the frequency and number of gearshifts that is needed when the vehicle travels the imminent drive route. A varied topography will lead to a higher number of gearshifts and many short downhill and uphill stretches will lead to a higher frequency of the gearshifts.

As a result, vehicles equipped with a navigation device can include algorithms to analyse road topography, curvature and other relevant data collected by the navigation device, to generate a driveline control scheme for the imminent drive route. In this context the algorithm could predict a road stretch with a high clutch temperature during the imminent drive route, e.g. a road stretch indicated with a clutch severity classification.

The propulsion unit is normally a combustion engine. The clutch is thereby provided in-between the combustion engine and the transmission in order to engage and disengage the transmission from the combustion engine.

An imminent driving route is the driving route laying a head of the vehicle. The time-period for the imminent drive route that is predicted is dependent on the thermal inertia of a clutch cooling system. The time-period for the imminent drive route is e.g. up to about 5 minutes, or up to about 10 minutes or up to about 15 minutes into the future.

According to one exemplary embodiment the expected clutch temperature is further at least dependent on the clutch severity classification such that a high clutch severity classification gives a higher expected clutch temperature. The clutch severity classification can be graded, where a high grade indicates a higher probability of increased clutch temperature and a low grade indicates a lower probability of increased clutch temperature. An exemplary effect of grading the clutch severity classification is that a probability of actually reaching a critical clutch temperature is achieved instead of just a "yes" or "no", whereby the measures of the critical heat mode can be selected dependent on the grading of the clutch severity classification.

A clutch severity classification grading could be form 1 to 5, where 1 is the lowest risk for increased clutch temperature and 5 the highest risk for increased clutch temperature. For example, a straight road stretch with tarmac as road surface, no uphill or downhill slopes and no crossings, would not get a clutch severity classification at all. Whereas a light uphill could have a clutch severity classification 1 and a steep uphill road stretch would get a clutch severity classification 5. The clutch severity classification may be pre-programmed into the navigation system of the vehicle and be accessible by the driveline control device, or be a historical value based on vehicle or fleet experience. As is understood from this description the clutch severity classification may be dependent on additional parameters than the uphill inclination of the road, such as curvature, intersections, weather, temperature and/or traffic situation (e.g. risk of traffic congestion).

According to one exemplary embodiment the clutch severity classification is further at least dependent on that a steep uphill road inclination gives a high clutch severity classification and a low uphill inclination gives a low clutch severity classification. The uphill road inclination is the factor most effecting the clutch severity classification and the gross weight of the vehicle is the vehicle parameter that has the highest influence of the expected clutch temperature.

According to one exemplary embodiment the clutch severity classification is further dependent on the presence of any intersections and/or curves of the road during the imminent drive route, wherein an uphill road inclination in combination with an intersection and/or curve of the road during the imminent driving route, increases the clutch severity classification. A high amount of curves, especially sharp curves in combination with a varied topography will also increase the load on the clutch. It is especially repeated starts with heavy load that increases the clutch temperature to critical levels.

According to an exemplary implementation of the method the critical heat mode at least comprises one of;
    down prioritizing gear shifts such that a current gear is used over a wider rpm interval than in a normal driveline control mode,
    controlling the transmission to skip gears, down-prioritizing comfort such that a gear shift of the transmission is performed with less clutch slippage than during a normal driveline control mode.

controlling the clutch to only perform power cut-off shifts.

All the above mentioned measures have the effect that the clutch load is decreased, whereby less heat will be generated.

When the transmission skips gears it performs a gearshift from e.g. second to fourth gear, or second to fifth gear or similar, instead of consecutive gear shifts, e.g. second to third gear, third to fourth gear, fourth to fifth gear, such gear skips reduces the number of clutch engagements which generates heat.

If the clutch is a double clutch in a double clutch transmission, the clutch can be controlled to only perform power cut-off shifts, in-different to the standard powershifts normally performed with a double clutch transmission. A power cut-off shift can be performed with much less clutch slippage than a powershift.

It is suggested that the method step of estimating a clutch temperature for the imminent drive route is further dependent on at least one of;

traffic situation of the imminent drive route,
temperature along the imminent drive route, and
weather conditions of the imminent drive route.

Information about the traffic situation can be received and provided through the navigation device. A dense traffic situation and especially traffic congestions increases the probability of a high clutch temperature, due to the increased starts needed if there is a queue in the traffic. Especially queuing in an uphill slope generates a lot of heat, due to the high clutch slippage and repeated start procedures of the vehicle. The information about traffic situation thereby increases the accuracy of the expected clutch temperature estimation. In one exemplary embodiment, the clutch severity classification comprises at least a dynamic traffic information value representing a traffic density, whereby the traffic information is requested when needed, i.e. when the imminent driving route comprises a clutch severity classification, grading of the clutch severity classification is updated with the latest traffic density information.

The temperature and weather along the imminent drive route can also effect the clutch load and thereby the clutch severity classification. For example, if the temperature is around zero degrees Celsius, and rain or snowfall, it is a high probability that the road surface will be slippery. A slippery road surface needs a more defensive driving pattern, which normally includes more clutch slippage during gearshifts and especially starts and stops of the vehicle, and therefore also a higher clutch temperature. In one exemplary embodiment, the clutch severity classification comprises at least a dynamic weather value representing a temperature and/or presence of rain and/or snow. The dynamic value can be requested and calculated when needed, i.e. when the imminent driving route comprises a clutch severity classification, whereby the grading or the clutch severity classification is updated dependent on the latest weather information.

Vehicle parameters, such as current clutch temperature, vehicle weight, e.g. gross combination weight (GCW), or vehicle rolling resistance can also effect the clutch load and thereby clutch temperature. For example, the clutch load will be much higher on a truck with a heavy loaded trailer, than a truck with a trailer with light load or no trailer or load at all. An additional parameter is the present clutch temperature that effects the clutch temperature during the imminent drive route.

In one embodiment of the method, it further comprise the steps of;

continually detecting the actual clutch temperature, and if the actual clutch temperature exceeds the clutch temperature threshold value, increasing the clutch severity classification for a position where the clutch temperature exceeded the clutch temperature threshold value, or registering (109) a clutch severity classification (CSC) for a position where the clutch temperature exceeded the clutch temperature threshold value (Tt).

An exemplary effect of continually updating positions with clutch severity classes or renewed grading of the existing clutch severity class is that a more accurate clutch temperature estimate can be achieved over time, especially if the information is shared within a fleet of vehicles. In one exemplary embodiment the actual temperature is continually compared with the estimated temperature (if there is an estimated temperature, i.e. if there is a clutch severity classification of the current position) and the grading of the clutch severity classification is adjusted dependent on the accuracy of the estimated clutch temperature in relation to the actual clutch temperature.

For a wet clutch, the driveline further comprises a clutch cooling system, in which an oil is provided to flow through and disperse heat from the clutch. In one embodiment of the method the step of controlling the driveline in a critical heat mode further comprises one of;

increasing the flow of the oil in the clutch cooling system, and reducing a temperature of the oil in the clutch cooling system.

An exemplary effect of the above two measures of increasing the flow and reducing the temperature of the oil in the clutch cooling system is that an increased heat dissipation from the clutch can be achieved. A high heat dissipation will reduce the overall clutch temperature.

The clutch cooling system is further connected to a driveline cooling system, which at least comprises a radiator, a cooling agent pump and a heat exchanger, all in fluid connection with each other such that the cooling agent pump can circulate a cooling agent in the driveline cooling system, wherein the heat exchanger is provided to disperse heat from the clutch cooling system (i.e. the oil of the clutch cooling system) to the driveline cooling system, wherein the cooling agent flow through the radiator can be controlled through a valve dependent on temperature of the cooling agent, and the valve is set to open when a temperature of the cooling agent is above a first opening temperature, and the method step of reducing the temperature of the oil in the clutch cooling system is achieved by the method steps of;

controlling the valve to open at a second opening temperature, wherein the second opening temperature is lower than the first opening temperature.

For example, the first opening temperature may be about 82-92° C.

In one exemplary embodiment, the second opening temperature is between 70 and 80° C., and preferably between 72 and 78° C. and more preferably between 74 and 76° C. In another exemplary embodiment is the second opening temperature equal to the ambient temperature of the vehicle. By setting the second temperature as the opening temperature, an maximum cooling effect is realised immediately.

An exemplary effect of introducing a second opening temperature such that the valve controlling the cooling agent flow to the radiator at a lower temperature the temperature control of the oil in the clutch cooling system can be better controlled and held at a lower temperature, which in turn has the same effect on the clutch temperature. The first opening temperature represents the opening temperature used in normal driveline control mode.

A driveline cooling system normally comprises a fan arranged to direct air onto the radiator, wherein the method step of reducing the temperature of the oil in the clutch cooling system is further achieved by the method steps of;
increasing a power of the fan.

The power of the fan is normally increased by that the speed of the fan is increased, such that a higher cooling effect on the radiator is achieved. This has the exemplary effect of increased control of the cooling agent temperature in the driveline cooling system and thereby also increased control of the temperature of oil in the clutch cooling system and ultimately increased heat dissipation from the clutch.

In one embodiment of the method, the fan is adapted to start when the temperature of the cooling agent is above a first start temperature, wherein the method step of reducing the temperature of the oil in the clutch cooling system is further achieved by the method steps of;
controlling the fan to start at a second start temperature, which is lower than the first start temperature.

An exemplary effect of having a second start temperature for the fan is correspondent to the effect of having a second opening temperature of the valve to the radiator, i.e. increased temperature control. The first opening temperature represents the opening temperature in a normal driveline control mode.

An exemplary second start temperature is between 75 and 85° C. and preferably between 77 and 83° C. and more preferably between 79 and 81° C. In another exemplary embodiment is the second start temperature equal to the ambient temperature of the vehicle. By setting the second temperature as the opening temperature, a maximum cooling effect is realised immediately.

An exemplary effect of monitoring the actual clutch temperature and comparing it with the estimated clutch temperature is that the clutch severity classification can be updated dependent on the actual clutch temperature when driving the imminent drive route. This will allow for future more accurate clutch temperature calculations.

Normally the driveline cooling system comprises a cooling agent pump which is arranged to circulate the cooling agent in the driveline cooling system, wherein in one embodiment of the method, it further comprises the steps of;
increasing the flow of the cooling agent in the driveline cooling system.

Commonly the cooling agent pump of the driveline cooling system is provided with at least a low speed and high speed mode, where the low speed mode has a flow that is about 50% lower than in the high speed mode. The cooling agent pump in the driveline cooling system is normally controlled dependent on engine parameters, such as engine torque, engine rpm and cooling agent temperature in the engine. However, according to this embodiment of the method the cooling agent pump is instead controlled dependent on the clutch temperature through activation of the critical heat control mode of the driveline.

In one embodiment of the method, the detecting of the temperature of the clutch is performed by;
measuring the temperature directly at the clutch or
measuring the temperature of the oil in the clutch cooling system or
determining the temperature of the clutch dependent on the input speed, the output speed and the transferred torque.

One aspect of this disclosure concerns a computer program product comprising program code means for performing the steps of any aspect of the method, when the program runs on a computer.

One aspect of this disclosure concerns a computer readable medium carrying a computer program comprising program code means for performing the steps of any aspect of the method, when the program product runs on a computer.

One aspect of this disclosure concerns a control unit for controlling a driveline of a vehicle, the control unit being configured to control the driveline by performing the steps of the method according to any aspect of the method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present invention will now be described more fully hereinafter with reference to the accompanying drawings, in which exemplary embodiments of the method are shown. The method may however be embodied in many different forms and should not be construed as limited to the embodiments set forth herein; rather, these embodiments are provided for thoroughness and completeness, and full convey the scope of the invention to the skilled addressee. Like reference characters refer to the like elements throughout the description.

Figure 1:
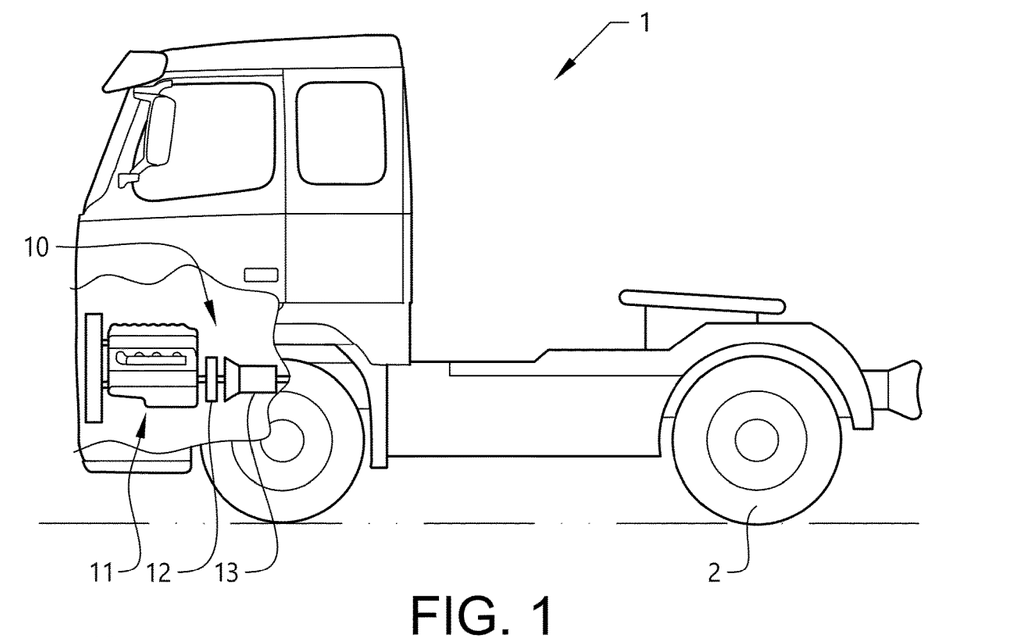
FIG. 1 is a side view of a truck being provided with driveline controlled according to the method of claim 1 of the present disclosure disclosed.

FIG. 1 schematically illustrates a truck 1 with a driveline 10, on which the method of claim 1 can be applied. In FIG. 1 the main parts of the driveline 10 is also disclosed; the propulsion unit 11, the clutch 12, the transmission 13 and the drive wheels 2. The propulsion unit 11 is normally a combustion engine.

Figure 2:
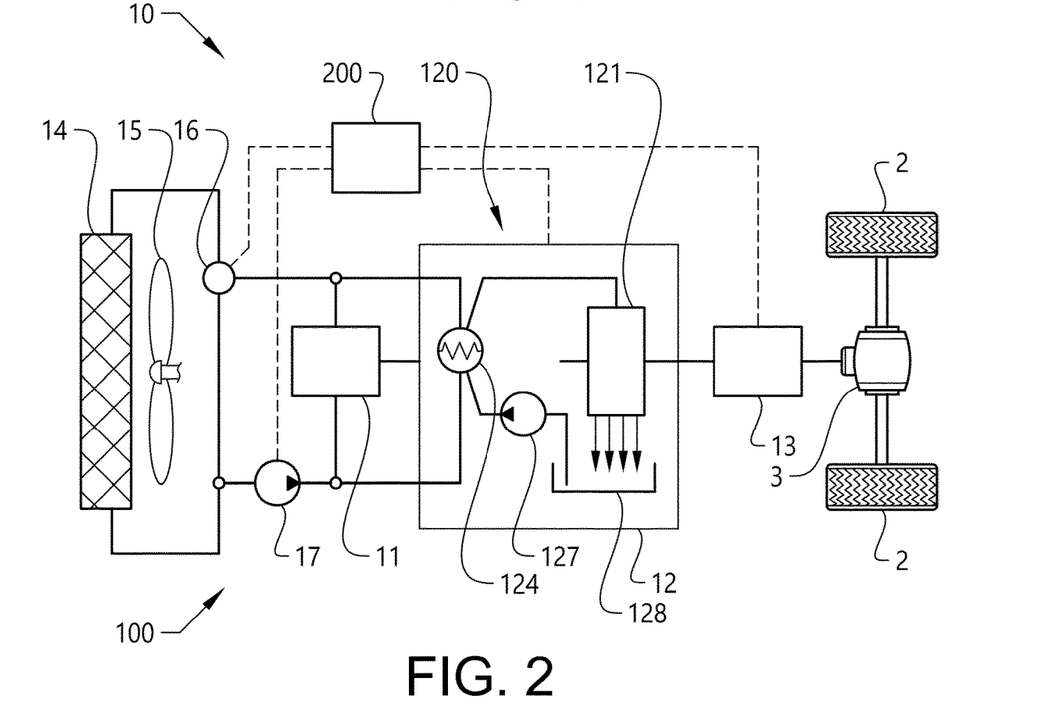
FIG. 2 is a schematic drawing of a driveline controlled according to the method of claim 1 of the present disclosure disclosed.

FIG. 2 schematically illustrates the driveline 10 of the truck 1. The driveline 10 is provided with a propulsion unit 11, a clutch 12 and a transmission 13, whereby the clutch 12 is provided to engage and disengage the propulsion unit 11 to/from the transmission 13. Further can the differential gear 3 and the drive wheels 2 of the driveline be seen in the FIG. 2.

The exemplary driveline 10 in FIG. 2 further discloses a driveline cooling system 100, which comprises a radiator 14, a pump 17, and a valve 16 and cooling agent conduits, wherein the cooling agent conduits sets the radiator 14, the pump 17 and the valve 16 in fluid connection with each other. The driveline cooling system 100 further comprise a fan arranged to direct air onto the radiator 14.

The clutch 12 comprises the clutch unit 121 and a clutch cooling system 120, which is arranged to dissipate heat from the clutch unit 121. The clutch cooling system 120 comprises an oil pump 127, a heat exchanger 124 and an oil sump 128, the clutch cooling system 120 is arranged such that the pump 127 pumps oil from the oil sump 128 into the heat exchanger 124 and therefrom into the clutch unit 121, from which the oil is returned into the oil sump 128.

The heat exchanger 124 of the clutch cooling system is further connected to the conduits 18 of the driveline cooling system 100, such that the cooling agent of the driveline cooling system can absorb the heat from the oil in the clutch cooling system 120 through the heat exchanger 124.

In the exemplary and schematically disclosed driveline 10 of FIG. 2 is further a control unit 200 disclosed. The control unit 200 is connected to the local controllers of the controllable parts of the driveline 10, such that it can communicate with them. The connection can be wired or wireless.

The exemplary driveline 10 in FIG. 2 discloses a wet-clutch 12. A dry-clutch would not be provided with the clutch cooling system 120. The aspects of the method, which do not involve any control of the clutch cooling system 120 are applicable also on a driveline provided with a dry-clutch. A driveline comprising a dry-clutch is known in the art and will not be further explained in this application.

Figure 3:
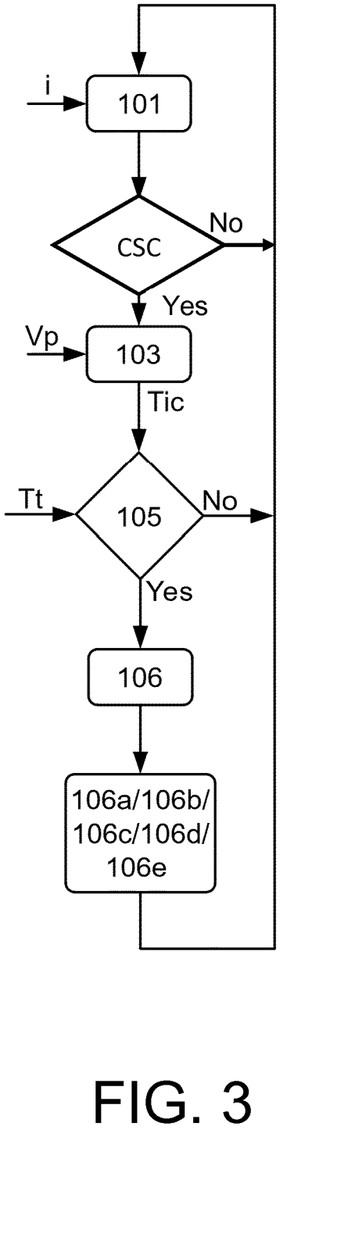
FIG. 3 is a flowchart of an embodiment of the method disclosed.

FIG. 3 discloses an exemplary embodiment of the method according to this disclosure. The method starts with predicting 101 an imminent drive route. The imminent drive route is predicted from information i, such as current location, maps information, destination information and/or probability calculations. Thereafter, in method step CSC it is determined if the imminent drive route comprises a clutch severity classification. Whereby if the imminent drive route does not comprise a clutch severity classification the method starts over again. However, if the imminent drive route comprises a clutch severity classification an expected clutch temperature Tic is estimated in method step 103, based on at least the clutch severity classification and at least one vehicle parameter Vp. The at least one vehicle parameter can be: total vehicle weight, e.g. gross combination weight (GCW), rolling resistance, clutch temperature, temperature of driveline cooling system 100 and/or temperature of oil in clutch cooling system 120 (if wet clutch system).

The estimated expected clutch temperature Tic is compared 105 with a clutch temperature threshold value Tt. If the expected clutch temperature Tic is below the clutch temperature threshold value Tt, the method restarts and if the expected clutch temperature Tic is above a the clutch temperature threshold value Tt, the control unit 200 controls the driveline 100 in a critical heat mode.

The critical heat mode reduces the heat-increase predicted for the imminent drive route, by implementing one or several clutch heat-increase reducing measures, which is not present in a normal driveline control mode. Which and how many heat-increase reducing measures that is implemented is dependent on how much the expected clutch temperature exceeds the clutch temperature threshold value. The heat-increase reducing measures can be divided into at least two categories; clutch actuation measures and clutch cooling measures.

In the exemplary flowchart of an implementation of the method disclosed in FIG. 3 measures relating to clutch auctions are disclosed. These are:
down prioritizing gear shifts 106a such that a current gear is used over a longer rpm interval than in a normal driveline control mode,
controlling 106b the transmission 13 to skip gears,
down-prioritizing comfort 106c such that a gear shift of the transmission 13 is performed with less clutch slippage than during a driveline control mode,
controlling 106e the clutch 12 to only perform power cut-off shifts, i.e. only possible for DCT-applications.

All the above measures reduces the clutch load and thereby reduces the heat-increase of the clutch when the vehicle passes the imminent drive route. One or several of these measures can be used.

Figure 4:
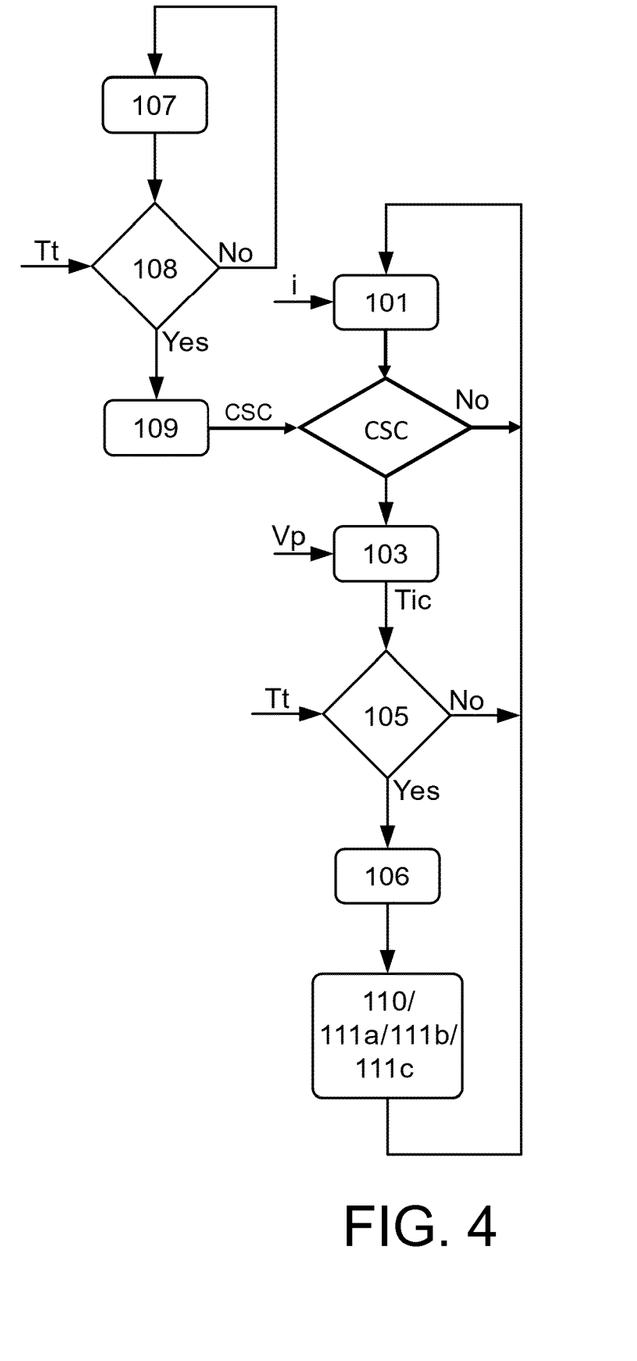
FIG. 4 is a flowchart of an embodiment of the method disclosed.

In FIG. 4 a flowchart of an alternative implementation of an exemplary method is disclosed. The implementation disclosed in FIG. 4 differs from the implementation disclosed by the flowchart in FIG. 3 in that a continually monitoring of the actual clutch temperature is done, in order to update a position with a clutch severity classification CSC where the estimation and actual clutch temperature does not cohere. Further, the critical heat mode of the driveline of the method disclosed in FIG. 4 comprises additional measures to reduce the heat-increase relating to clutch cooling.

In the exemplary flowchart of an implementation of the method disclosed in FIG. 4 the critical heat control mode, comprises measures relating to clutch cooling:
increasing 110 the flow of the oil in the clutch cooling system 120,
reducing 111a, 111 b, 111c a temperature of the oil in the clutch cooling system 120,
controlling 111a the valve 16 to open at a second opening temperature, wherein the second opening temperature is lower than the first opening temperature,
increasing 111b a power of the fan 15,
controlling 111c the fan 15 to start at a second start temperature, which is lower than the first start temperature.

All the above measures reduces the heat-increase of the clutch 120 in that they directly or indirectly increases the cooling of the clutch unit 121 and thereby reduces the heat-increase of the clutch 120 when the vehicle passes the imminent drive route.

Even though they are disclosed in separate implementations in FIGS. 3 and 4 respectively, one or a plurality of clutch actuation measures can be combined with one or a plurality of clutch cooling measures and vice versa.

In the flowchart of the exemplary implementation shown in FIG. 4, the actual temperature of the clutch 120 is monitored 107, i.e. continually detected, and compared 108 to the clutch temperature threshold value Tt. If the actual clutch temperature exceeds the clutch temperature threshold value Tt, the grading of the clutch severity classification CSC is increased 109 for the position where the clutch temperature exceeded the clutch temperature threshold value Tt. In the case where the position did not have a clutch severity classification CSC beforehand, it becomes updated with one.

Even though the update of the clutch severity classification CSC is only disclosed in the flowchart in FIG. 4, the update can be made in the implementation of the method disclosed in the flowchart of FIG. 3. Overall, the differences of the implementations disclosed in the flowcharts in FIG. 3 and FIG. 4 are possible to combine in both directions.

By updating the clutch severity classification CSC, it is possible to make a better clutch temperature calculation next time the same road stretch/position occurs in an imminent drive route estimation.

In one exemplary embodiment of the method the critical heat mode is introduced step wise, where the critical heat mode is provided with at least two different priority modes. In a low priority mode that is activated first only measures that does not affect the driving comfort are activated. Such measures could for example be the measures relating to clutch cooling.

Because clutch actuation measures affects the driving behaviour of the vehicle, these will be experienced as more disturbing the comfort, whereby it is suggested that these measures are introduced first in a high priority mode, if the low priority mode measures are deemed not to be sufficient. The high priority mode could be introduced in situations, where a high clutch temperature is imminent or when the expected clutch temperature Tic is above the clutch temperature threshold value Tt, despite the low priority mode measures.

In one exemplary embodiment, all the heat-increase reducing measures can be prioritised dependent on how comfort disturbing they are. Whereby their activation can be made dependent on their priority order and the expected clutch temperature.

It is to be understood that the present invention is not limited to the embodiments described above and illustrated in the drawings; rather, the skilled person will recognize that many changes and modifications may be made within the scope of the appended claims.

The invention claimed is:

1. A method for controlling a driveline of a vehicle, wherein the driveline at least comprises a transmission and a clutch, wherein the clutch is adapted to be provided between the transmission and a propulsion unit of the driveline, wherein the method comprises the step of;
    predicting an imminent drive route,
    wherein the method further comprises the steps of;
    identifying if the imminent drive route comprises any clutch severity classification, and when the imminent drive route comprises a clutch severity classification;
    estimating an expected clutch temperature dependent on at least the clutch severity classification and one vehicle parameter,
    wherein, the clutch severity classification is at least dependent on an inclination of the imminent drive route, and when the expected clutch temperature is above a clutch temperature threshold value;
        controlling the driveline in a critical heat mode, wherein in the critical heat mode the transmission is controlled such that a clutch temperature increase is lower in comparison to a normal driveline control mode.

2. The method according to claim 1, wherein the expected clutch temperature is dependent on the clutch severity classification such that a high clutch severity classification gives a higher expected clutch temperature.

3. The method according to claim 1, wherein a steep uphill road inclination gives a high clutch severity classification, and a low uphill road inclination gives a low clutch severity classification.

4. The method according to claim 1, wherein the clutch severity classification further is dependent on the presence of any intersections and/or curves of the road during the imminent drive route, wherein an uphill road inclination in combination with at least one of an intersection and a curve of the road during the imminent driving route, increases the clutch severity classification.

5. The method according to claim 1, wherein the critical heat mode at least comprises one of;
    down-prioritizing gear shifts such that a current gear is used over a wider rpm interval than in the normal driveline control mode,
    controlling the transmission to skip gears,
    down-prioritizing comfort such that a gear shift of the transmission is performed with less clutch slippage than during the normal driveline control mode,
    controlling the clutch to only perform power cut-off shifts.

6. The method according to claim 1, wherein the estimation of the expected clutch temperature for the imminent drive route further is dependent on at least one of;
    traffic situation of the imminent drive route,
    temperature along the imminent drive route, and
    weather conditions of the imminent drive route.

7. The method according to claim 1, wherein the method further comprise the steps of;
    continually detecting the actual clutch temperature,
    and when an actual clutch temperature exceeds the clutch temperature threshold value,
    increasing the clutch severity classification for a position where the actual clutch temperature exceeded the clutch temperature threshold value or
    registering the clutch severity classification for a position where the actual clutch temperature exceeded the clutch temperature threshold value.

8. The method according to claim 1, wherein the driveline further comprises a clutch cooling system, in which an oil is provided to flow and disperse heat from the clutch and the method step of controlling the driveline in the critical heat mode further comprises one of;
    increasing the flow of the oil in the clutch cooling system, and
    reducing a temperature of the oil in the clutch cooling system.

9. The method according to claim 8, wherein the driveline further comprises a driveline cooling system, which at least comprises a radiator, a cooling agent pump and a heat exchanger, all in fluid connection with each other such that the cooling agent pump can circulate a cooling agent in the driveline cooling system, wherein the heat exchanger is provided to disperse heat from the clutch cooling system to the driveline cooling system, wherein the cooling agent flowing through the radiator can be controlled through a valve dependent on temperature of the cooling agent, and the valve is set to open when a temperature of the cooling agent is above a first opening temperature, and the step of reducing the temperature of the oil in the cooling system is achieved by the method steps of;
    controlling the valve to open at a second opening temperature, wherein the second opening temperature is lower than the first opening temperature, and the second opening temperature is equal to the ambient temperature of the vehicle, or between 70 and 80° C., or between 72 and 78° C., or between 74 and 76° C.

10. The method according to claim 9, wherein the driveline cooling system further comprises a fan arranged to direct air onto the radiator, wherein the method step of reducing the temperature of the oil in the cooling system is further achieved by the method step of;
    increasing a power of the fan.

11. The method according to claim 9, wherein the driveline cooling system further comprises a fan arranged to direct air onto the radiator, and the fan is adapted to start when the temperature of the cooling agent is above a first start temperature, wherein the method step of reducing the temperature of the oil in the cooling system is further achieved by the method step of;
    controlling the fan to start at a second start temperature which is lower than the first start temperature, and the second start temperature is equal to the ambient temperature of the vehicle, or between 75 and 85° C., or between 77 and 83° C., or between 79 and 81° C.

12. The method according to claim 9, wherein the clutch cooling system comprises a fluid pump, which is arranged to circulate the cooling agent in the driveline cooling system, wherein the method further comprises the step of;
increasing the flow of the cooling agent in the driveline cooling system.

13. A non-transitory computer readable medium carrying a computer program comprising program code for performing the steps of claim 1, when the program code runs on a computer.

14. A control unit for controlling a driveline of a vehicle, the control unit being configured to control the driveline by performing the steps of the method according to claim 1.

* * * * *